US012090414B2

(12) United States Patent
Moyer

(10) Patent No.: US 12,090,414 B2
(45) Date of Patent: Sep. 17, 2024

(54) ILLUMINATED PINBALL MACHINE LEGS

(71) Applicant: Amy Moyer, Fleetwood, PA (US)

(72) Inventor: Amy Moyer, Fleetwood, PA (US)

( * ) Notice: Subject to any disclaimer, the term of this patent is extended or adjusted under 35 U.S.C. 154(b) by 0 days.

(21) Appl. No.: 18/364,955

(22) Filed: Aug. 3, 2023

(65) Prior Publication Data

US 2024/0042307 A1 Feb. 8, 2024

Related U.S. Application Data

(60) Provisional application No. 63/370,437, filed on Aug. 4, 2022.

(51) Int. Cl.

| | |
|---|---|
| ***A63F 7/36*** | (2006.01) |
| ***F21V 11/00*** | (2015.01) |
| *A63F 7/02* | (2006.01) |

(52) U.S. Cl.

CPC ................ *A63F 7/36* (2013.01); *F21V 11/00* (2013.01); *A63F 7/027* (2013.01); *A63F 2007/3685* (2013.01)

(58) Field of Classification Search

CPC .................................. A63F 7/36; F21V 11/00

See application file for complete search history.

(56) References Cited

U.S. PATENT DOCUMENTS

| | | | | |
|---|---|---|---|---|
| 2014/0293598 | A1* | 10/2014 | Bruck | F21V 33/008 362/234 |
| 2019/0293278 | A1* | 9/2019 | McNae | A63F 13/285 |
| 2021/0308550 | A1* | 10/2021 | Li | A63B 71/0622 |
| 2022/0105423 | A1* | 4/2022 | Meunier | F21S 4/28 |
| 2023/0293975 | A1* | 9/2023 | Mueller | G07F 17/3204 463/37 |

* cited by examiner

*Primary Examiner* — Christopher E Dunay

(74) *Attorney, Agent, or Firm* — Law Office of Jerry Joseph, PLC; Jerry K. Joseph

(57) ABSTRACT

The subject matter of this application pertains to illuminated legs for pinball machines. The legs have cut outs such as text and graphics. Lights on the inner surface of the leg illuminate the cut out sections. Lights may be housed within a payload which is inserted into the leg. The lights are connected to a power source and a controller and may be synced to other lights on the pinball machine.

21 Claims, 4 Drawing Sheets

ILLUMINATED PINBALL MACHINE LEGS

FIELD OF THE INVENTION

The present disclosure is generally directed to pinball machine legs comprising cut-outs and illuminated from within the leg. More generally the subject matter of this application pertains to games and gaming tables comprising legs illuminated internal lights. Even more generally, the subject matter of this application pertains to pinball machine legs having three sides. Further, the subject matter of this application pertains to legs comprising cut-outs. The subject matter of this application of this application also pertains to methods and devices of illuminating pinball machine legs.

BACKGROUND OF THE INVENTION

Pinball machines employ several effects to entice potential players such as periodic lighting displays, music, and sound effects. Currently, these effects are largely limited to the backbox (or head) of the machine and the playfield, including the several features found on the playfield. Outside of a few machines that have illuminated flipper buttons on the side, the rest of most machines are devoid of lights.

What is needed is an additional feature to distinguish one pinball machine from another. Preferably such a feature enhances the aesthetics of the pinball machine and entices interest from potential players. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The subject matter of this application satisfies the above stated needs. Disclosed herein are methods and devices for creating unique and novel pinball machine legs which are easily distinguished from those known in the market. More particularly, the subject matter of this application pertains to three-sided legs for pinball machines, particularly such legs in which at least one side of the leg comprises a cut-out section, and even more particularly, those three-sided leg comprising cut-out section and which further comprise a lighting element.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Wherever possible, the same reference numbers will be used throughout the drawings to represent the same parts.

DETAILED DESCRIPTION OF THE INVENTION

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The subject matter of this application involves cutting out text or graphics in a pinball machine leg and illuminating the leg by its own power source or interactively from the voltage supplied directly from the pinball machine itself.

Figure 1:
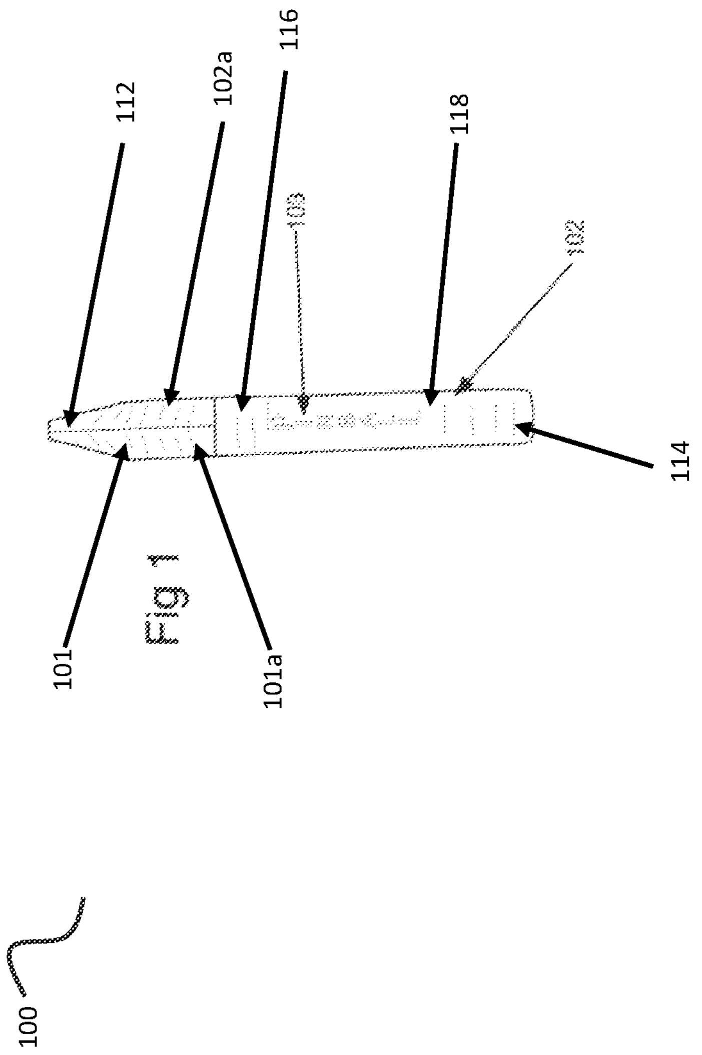
FIG. 1 Is an illustration of a three-sided pinball machine leg from the third side.
Figure 2:
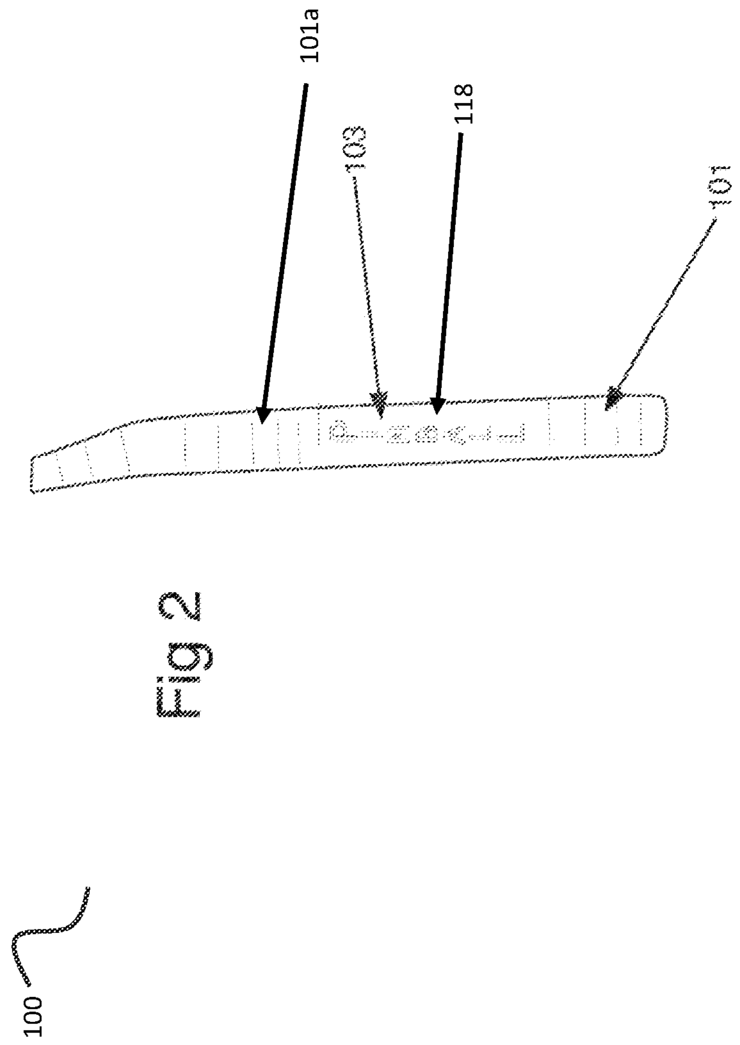
FIG. 2 is an illustration of the leg of FIG. 1 from a different side.
Figure 3:
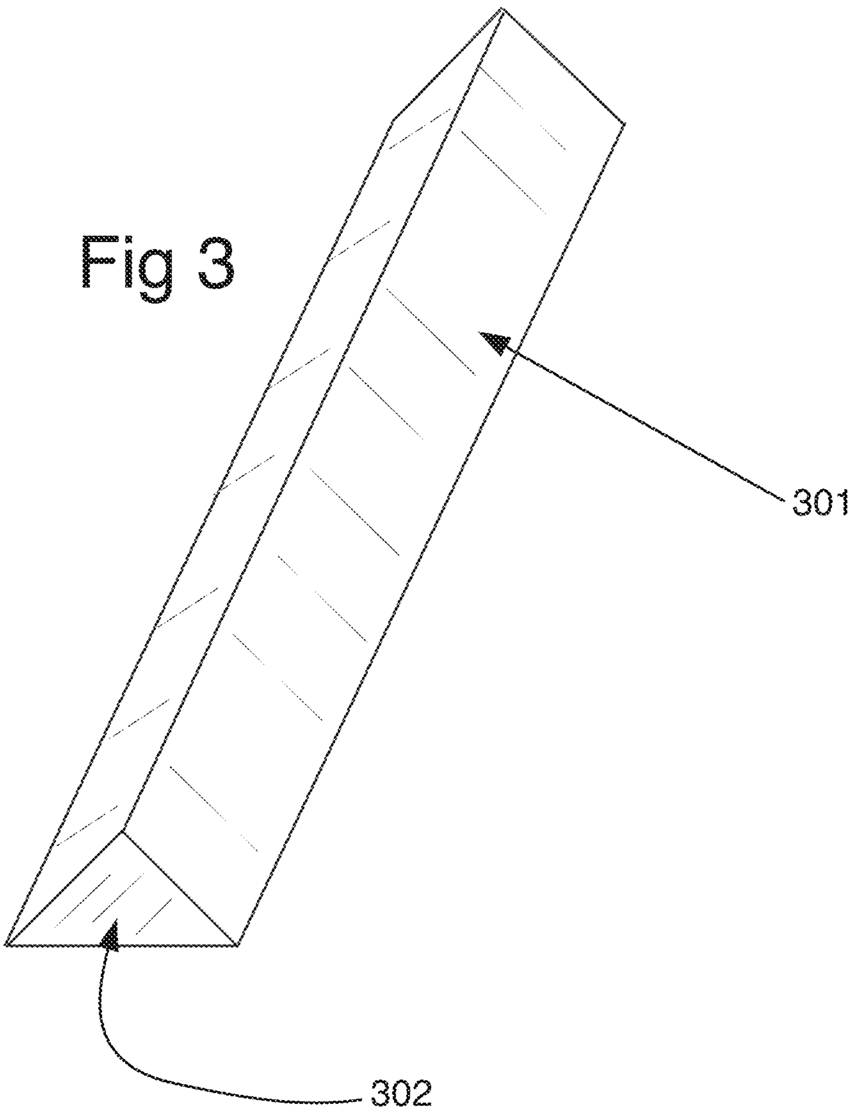
FIG. 3 is an illustration of a lighting package for a leg.
Figure 4:
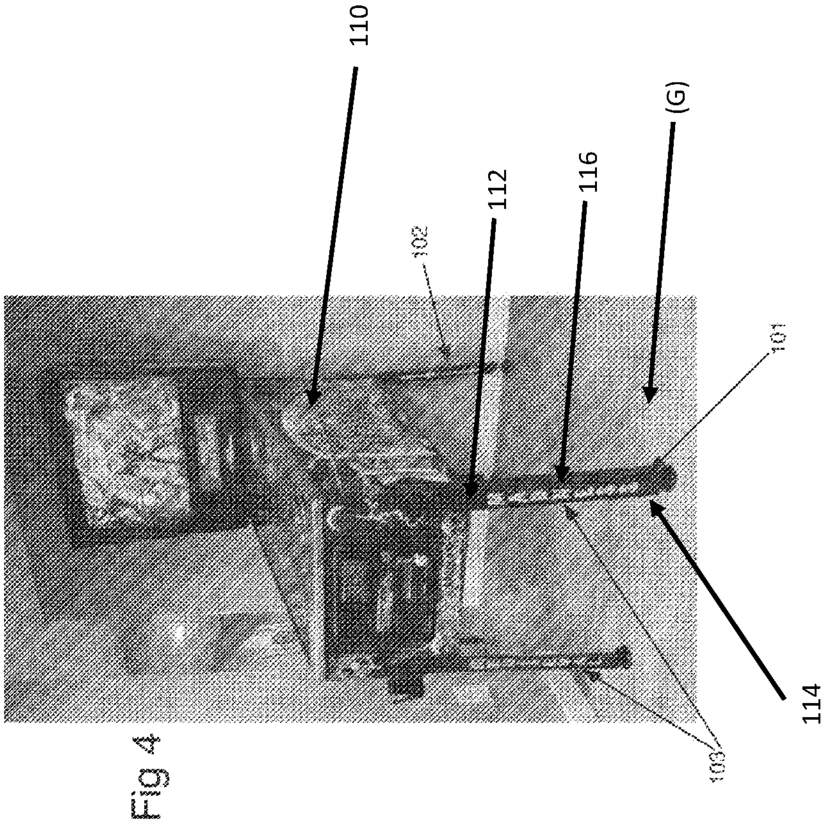
FIG. 4 is an illustration of the disclosed legs on a pinball machine.

First we designed a closed three sided pinball machine leg 100 for a pinball machine 110 (FIGS. 1 and 2) that is superior in strength to the traditional two sided leg. As shown in FIG. 1, the leg 100 includes a first end 112 configured to be attached to a portion of the pinball machine 110, a second end 114 configured to be in operative contact with a ground (G), and an intermediate portion 116 that extends vertically between the first end 112 and the second end 114 and includes an outer surface 118. The intermediate portion 116 includes an elongated opening extending intermediate the first end 112 and the second end 114 comprising an interior area (the elongated opening and interior are not shown but extend through the interior of leg 100). The first side (e.g., 101) and second side 104 of each leg intersect at approximately 90° and each include a respective face 101*a* and 104*a*. The third side (102) is attached to the first and second sides at approximately 45° and includes a face 102*a*. Other embodiments may comprise four or more sides. Yet another embodiment of the invention comprises two-sided pinball machine legs. All such should be considered within the scope of claims. The legs may be powder coated or otherwise treated before attachment to a pinball machine.

Then by means of laser jet or water jet we cut surface openings 103 in the steel pinball machine leg to display custom fonts or graphics (e.g., 103) on at least one side of a leg.

After the cutting process is complete we insert light tubes (301) and reflective white backgrounds into each cut leg.

Each color light tube houses a lighting system (302) comprised of at least one light source of at least one color.

The light source may be of any kind suitable such as light emitting diodes, fluorescent bulbs, or incandescent sources.

In certain embodiments, the lighting system may be installed on the inside face of a leg without the use of a light tube.

In a mostly highly preferred embodiment these lighting systems are wired to a control board in the pinball machine itself such that, i.e., lights on the head of the machine and the lighting system within a light tube is triggered by the same control board. In another embodiment, the lighting system within a light tube is controlled by a separate circuit. In either embodiment, the illuminated pinball machine legs may be powered via a jumper from the power supply of the pinball machine itself or have a separate power supply independent of the machine.

Although the disclosed illuminated pinball machine legs may be installed during assembly, the legs and light tubes may be added to existing machines by a hobbyist or collector and connected to the pinball machine via clip-on or solder connections or controlled independently of the machine.

The invention claimed is:

1. A leg configured for attachment to a pinball machine, comprising:

a first end, wherein the first end is configured to be attached to a portion of the pinball machine, a second end, wherein the second end is configured to be in operative contact with a ground, an intermediate portion, wherein the intermediate portion extends vertically between the first end and the second end, wherein the intermediate portion includes an outer surface, and an elongated opening having an interior area extending intermediate the first end and the second end, wherein the interior area includes at least one lighting system extending therein, wherein the lighting system is in operative connection with a power supply and is configured to illuminate the interior area, wherein the intermediate portion includes at least one surface opening extending from the outer surface of the leg into the interior area, and wherein illumination from the lighting system is viewable through the at least one surface opening.

2. The leg according to claim 1, wherein the intermediate portion is comprised of three sides.

3. The leg according to claim 2, wherein each side includes a face having a respective outer surface, and wherein at least one outer surface of one of the three sides includes the surface opening.

4. The leg according to claim 3, wherein the interior area of the intermediate portion includes a reflective background configured to enhance the illumination of the at least one lighting system.

5. The leg according to claim 4, wherein the reflective background is white.

6. The leg according to claim 5, wherein a first side is operatively connected to a second side at a 90° angle, and wherein a third side is operatively connected to each of the first and second sides at a 45° angle.

7. The leg according to claim 6, wherein the power supply comprises at least one of a power supply in operative connection with the pinball machine and an independent power supply associated with the leg.

8. The leg according to claim 7, wherein the at least one lighting system is configured to provide illumination of various colors.

9. The leg according to claim 8, wherein the lighting system is in operative connection with a control board, wherein the control board is configured to cause at least two different light displays.

10. The leg according to claim 9, wherein the control board comprises one of a control board associated with the pinball machine and a circuit separate from the pinball machine.

11. The leg according to claim 1, wherein the intermediate portion is comprised of two sides.

12. The leg according to claim 1, wherein the intermediate portion includes more than three sides.

13. A leg configured for attachment to a pinball machine, comprising:

at least one side, wherein the at least one side includes at least one surface opening, at least one lighting system, wherein the at least one lighting system extends within the leg and is configured to produce illumination viewable through the at least one surface opening, a power supply, wherein the power supply is in operative connection with the lighting system and is configured to cause illumination of the at least one lighting system, and a reflective background, wherein the reflective background extends within the leg and is configured to enhance the illumination of the lighting system.

14. The leg according to claim 13, including three sides.

15. The leg according to claim 14, wherein the reflective background is white.

16. The leg according to claim 15, wherein a first side is operatively connected to a second side at a 90° angle, and wherein a third side is operatively connected to each of the first and second sides at a 45° angle.

17. The leg according to claim 16, wherein the power supply comprises at least one of a power supply in operative connection with the pinball machine and an independent power supply associated with the leg.

18. The leg according to claim 17, wherein the at least one lighting system is configured to provide illumination of various colors.

19. The leg according to claim 18, wherein the at least one lighting system is in operative connection with a control board, wherein the control board is configured to cause at least two different light displays.

20. The leg according to claim 19, wherein the control board comprises one of a control board associated with the pinball machine and a circuit separate from the pinball machine.

21. A leg configured for attachment to a gaming machine, comprising:

a first end, wherein the first end is configured to be attached to a portion of the gaming machine, a second end, wherein the second end is configured to be in operative contact with a ground, an intermediate portion, wherein the intermediate portion extends vertically between the first end and the second end, wherein the intermediate portion includes an outer surface, and an elongated opening having an interior area extending intermediate the first end and the second end, wherein the interior area includes at least one lighting system extending therein, wherein the lighting system is in operative connection with a power supply and is configured to illuminate the interior area, wherein the intermediate portion includes at least one surface opening extending from the outer surface of the leg into the interior area, and wherein illumination from the lighting system is viewable through the at least one surface opening.

* * * * *